US012741373B2

(12) United States Patent
Hashizume

(10) Patent No.: US 12,741,373 B2
(45) Date of Patent: Sep. 22, 2026

(54) RECORDING MEDIUM AND TEACHING SUPPORT APPARATUS

(71) Applicant: Konica Minolta, Inc., Tokyo (JP)

(72) Inventor: Masaharu Hashizume, Okazaki (JP)

(73) Assignee: Konica Minolta, Inc., Tokyo (JP)

( * ) Notice: Subject to any disclaimer, the term of this patent is extended or adjusted under 35 U.S.C. 154(b) by 112 days.

(21) Appl. No.: 18/776,677

(22) Filed: Jul. 18, 2024

(65) Prior Publication Data

US 2025/0033199 A1 Jan. 30, 2025

(30) Foreign Application Priority Data

Jul. 28, 2023 (JP) ................................ 2023-123623

(51) Int. Cl.
*B25J 9/16* (2006.01)

(52) U.S. Cl.
CPC ............. *B25J 9/163* (2013.01); *B25J 9/1664* (2013.01)

(58) Field of Classification Search
None
See application file for complete search history.

(56) References Cited

U.S. PATENT DOCUMENTS

2010/0168950 A1* 7/2010 Nagano .................. B25J 9/1666 701/25
2023/0381959 A1* 11/2023 Thomaz .................. B25J 9/162
2024/0066698 A1* 2/2024 Campos Macias .... B25J 9/1676
2025/0249586 A1* 8/2025 Murray ................. B25J 9/1664

FOREIGN PATENT DOCUMENTS

JP 2007203380 A 8/2007
JP 2022076814 A 5/2022

* cited by examiner

*Primary Examiner* — Ryan Rink
(74) *Attorney, Agent, or Firm* — RANKIN, HILL & CLARK LLP

(57) ABSTRACT

Disclosed is a recording medium storing a program causing a computer to perform: sequentially acquiring nodes of an end effector of an articulated robot having joints and the end effector; and calculating, for each node, joint angle sets representing angles of the joints from the position information and the posture information in each node; creating posture sets in which a joint angle set selected for each node is combined and associated in an order of nodes; creating, based on each posture set, each path set including a discrete path of each joint for each posture set by creating, for each joint, the path from an angle of each joint of a joint angle set selected for a first node to an angle of each joint of a joint angle set selected for a last node; and selecting one path set based on an evaluation of each path set.

17 Claims, 5 Drawing Sheets

61

| NODE NUMBER=1 |
| --- |
| (x_1, y_1, z_1, roll_1, pitch_1, yaw_1) |

| EVALUATION RANK | SCORE |
|---|---|
| 1 | 0 |
| 2 | 1 |
| 3 | 2 |
| 4 | 3 |

FIG.9

| EVALUATION RANK | SCORE |
|---|---|
| 1 | 0 |
| 2 | 1 |
| 3 | 1 |
| 4 | 1 |

FIG.10

| EVALUATION RANK | SCORE |
|---|---|
| 1 | 0 |
| 2 | 2 |
| 3 | 4 |
| 4 | 6 |

FIG.11

| EVALUATION RANK | SCORE |
|---|---|
| 1 | 0 |
| 2 | 1.5 |
| 3 | 3 |
| 4 | 4.5 |

FIG.12

RECORDING MEDIUM AND TEACHING SUPPORT APPARATUS

BACKGROUND OF THE INVENTION

Technical Field

The present invention relates to a recording medium and a teaching support apparatus.

Description of Related Art

JP2007-203380A discloses a teaching support apparatus for supporting a worker in teaching a robot. A worker inputs, to the teaching support apparatus, a plurality of moving point information identifying a plurality of moving points, respectively, by using an input section of the teaching support apparatus. A calculation section of a teaching support apparatus calculates a plurality of solution candidates for each movement point. The solution candidate is data in which a posture taken by the robot when the hand of the robot is placed at the movement point is represented by an angle of each joint of the robot. After the calculation of the solution candidates, the calculation section of the teaching support apparatus calculates an evaluation value for each of all combinations of one solution candidate of the movement point and one solution candidate of the movement point adjacent thereto. The calculation section of the teaching support apparatus recognizes a combination having the highest cumulative evaluation value as optimum from among a plurality of combinations of solution candidates from the first movement point to the last movement point. The calculation section of the teaching support apparatus does not calculate a path connecting solution candidates of an optimum combination. A path is data that discretely represents the transition of the angle of each joint from the angle of the first solution candidate to the angle of the last solution candidate.

JP2022-76814A discloses a programming support device that generates an operation program to be executed by a robot controller to operate a robot. The programming support device generates an entire path representing a series of operations of the robot from a start point of the operation of the robot to an end point of the operation of the robot. The entire path includes at least the first work path, the air cut path, and the second work path in this order. The first and second work paths are paths for the robot to process the workpiece. The air cut path is a path connecting the first work path and the second work path. An air cut path is a path that does not involve processing on the workpiece. The programming support device extracts a plurality of candidate evacuation postures in the evacuation area serving as the end point of the first work path. The programming support device extracts a plurality of candidate approach postures in the approach area that is the end point of the second work path. The programming support device generates each of a plurality of candidate paths from a plurality of combinations each formed with one candidate evacuation posture and one candidate approach posture. The programming support device evaluates these candidate paths in terms of operating time. The programming support device selects a candidate path that realizes the minimum operation time from among the plurality of candidate paths. The programming support device determines the selected candidate path as an air cut path. This programming support device does not select any of the entire path candidates by evaluating a plurality of entire path candidates from a start point of an operation of the robot to an ending point of the operation of the robot. Therefore, until the robot operates from the start point to the end point, the joints of the robot may perform unnecessary movement.

SUMMARY OF THE INVENTION

Therefore, an object of one or more embodiments of the present invention is to prevent a joint of a robot from unnecessarily moving.

To achieve at least one of the abovementioned objects, according to an aspect of the present invention, recording medium reflecting one aspect of the present invention is a non-transitory computer-readable recording medium storing a program causing a computer to perform:

acquiring that is sequentially acquiring a plurality of nodes each including position information and posture information of an end effector of an articulated robot having a plurality of joints and the end effector; and calculating that is calculating, for each of the plurality of nodes acquired in the acquiring, a plurality of joint angle sets representing angles of the plurality of joints from the position information and the posture information included in each of the plurality of nodes;

combining that is creating a plurality of posture sets in which a joint angle set selected from among the plurality of joint angle sets for each of the plurality of nodes is combined and associated in an order of the plurality of nodes;

path creating that is creating, based on each of the plurality of posture sets, each of a plurality of path sets including a discrete path of each of the plurality of joints for each of the plurality of posture sets by creating, for each of the plurality of joints, the path from an angle of each joint of a joint angle set selected for a first node of the plurality of nodes to an angle of each joint of a joint angle set selected for a last node of the plurality of nodes; and evaluating that is selecting one path set from among the plurality of path sets based on an evaluation of each of the plurality of path sets.

To achieve at least one of the abovementioned objects, according to an aspect of the present invention, teaching support apparatus reflecting one aspect of the present invention is a teaching support apparatus comprising a hardware processor, wherein the hardware processor performs acquiring that is sequentially acquiring a plurality of nodes each including position information and posture information of an end effector of an articulated robot having a plurality of joints and the end effector, and calculating that is calculating, for each of the plurality of nodes acquired in the acquiring, a plurality of joint angle sets representing angles of the plurality of joints from the position information and the posture information included in each of the plurality of nodes, combining that is creating a plurality of posture sets in which a joint angle set selected from among the plurality of joint angle sets for each of the plurality of nodes is combined and associated in an order of the plurality of nodes, path creating that is creating, based on each of the plurality of posture sets, each of a plurality of path sets including a discrete path of each of the plurality of joints for each of the plurality of posture sets by creating, for each of the plurality of joints, the path from an angle of each joint of a joint angle set selected for a first node of the plurality of nodes to an angle of each joint of a joint angle set selected for a last node of the plurality of nodes, and evaluating that is selecting one path set from among the plurality of path sets based on an evaluation of each of the plurality of path sets.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 9 is a data table showing the relationship between the evaluation rank and the score;

FIG. 10 is a data table showing the relationship between the evaluation rank and the score;

FIG. 11 is a data table showing the relationship between the evaluation rank and the score; and FIG. 12 is a data table showing the relationship between the evaluation rank and the score.

DETAILED DESCRIPTION

Hereinafter, one or more embodiments of the present invention will be described with reference to the drawings. However, the scope of the invention is not limited to the disclosed embodiments.

1. OUTLINE OF TEACHING SUPPORT APPARATUS

Figure 1:
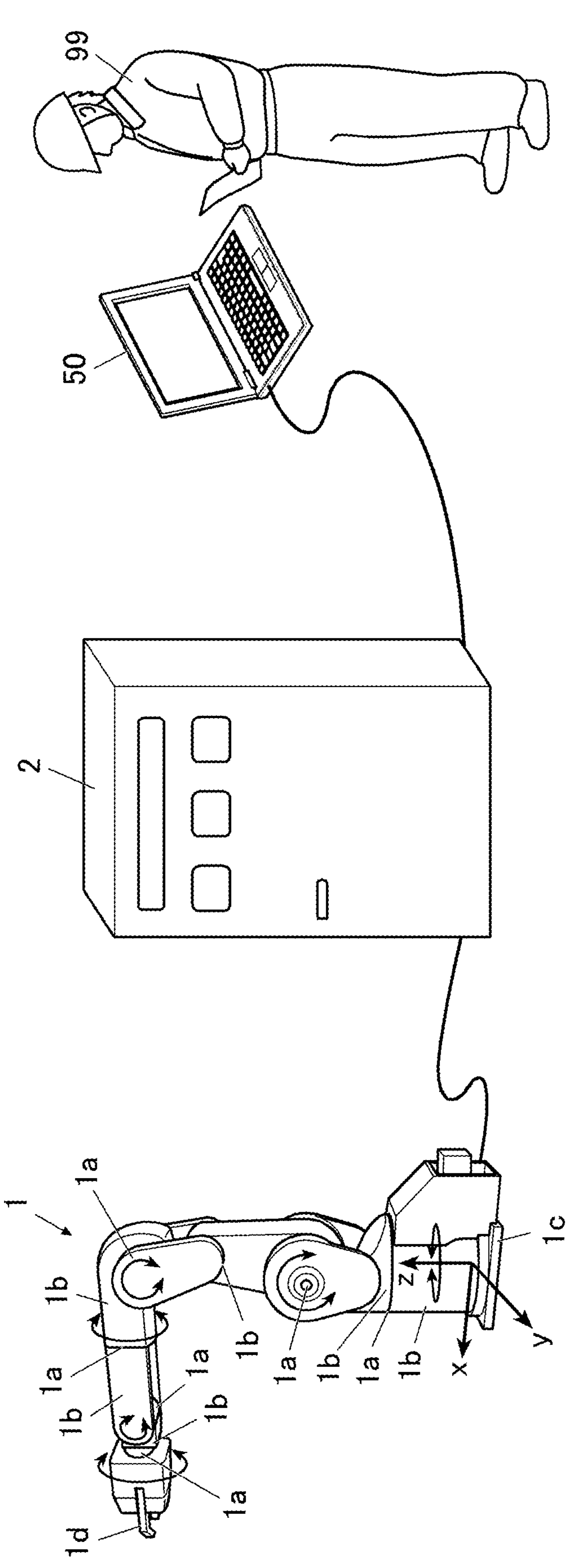
FIG. 1 is a diagram illustrating a robot, a robot control apparatus, and a teaching support apparatus.

FIG. 1 is a diagram illustrating a robot 1, a robot control apparatus 2, and a teaching support apparatus 50.

The teaching support apparatus 50 is a device that supports teaching work by the worker 99. The teaching work refers to work in which the worker 99 teaches the robot 1 by using the teaching support apparatus 50 so that the robot 1 can perform intended operation. Specifically, when the worker 99 inputs data such as numerical values and commands to the teaching support apparatus 50, the teaching support apparatus 50 creates an operation program executable by the robot control apparatus 2. The worker 99 copies, to the robot control apparatus 2, the operation program created by the teaching support apparatus 50, using a network or a portable recording medium.

The robot 1 is a six degree-of-freedom vertical articulated robot having six joints 1*a*. In other words, the robot 1 has a base 1*c* at the proximal extremity of the robot 1. The robot 1 includes an end effector 1*d* at a far end of the robot 1. The robot 1 includes a plurality of joints 1*a* and link 1*b* that connect the base 1*c* and the end effector 1*d*. The plurality of links 1*b* are connected in series from the base 1*c* to the end effector 1*d*. A non-distal-most joint 1*a* connects adjacent links 1*b*. A distal-most joint 1*a* connects the end effector 1*d* and the distal-most link 1*b*. Proximal refers to a side closer to a base 1*c* portion of the robot 1, and distal refers to a side closer to an end effector 1*d* portion of the robot 1. The robot 1 is also referred to as a manipulator. The end effector 1*d* is also referred to as a tool. Note that the number of joints of the robot 1 may be other than six. The number of joints of the robot 1 may be, for example, 3, 4, 5, or 7. In the following description, the number of joints of the robot 1 is six.

The operation program is executable by the robot control apparatus 2. When the robot control apparatus 2 controls the robot 1 according to the operation program, the robot 1 operates according to the control of the robot control apparatus 2. The operation program includes time-series data in which postures of the robot 1 are arranged in time series. The posture of the robot 1 is expressed by the angle of each joint 1*a* of the robot 1. That is, the operation program includes time-series data in which the angles of the respective joints 1*a* of the robot 1 are arranged in time series for the respective joints 1*a*. Such time-series data is also referred to as a path.

At the time of teaching work, the worker 99 operates the teaching support apparatus 50 so that the worker inputs a plurality of nodes to the teaching support apparatus 50 in order in an absolute coordinate system. Then, the teaching support apparatus 50 recognizes these nodes. The node refers to a via point through which the end effector 1*d* passes when the robot 1 operates in accordance with the operation program. The first input node is a starting point at which the end effector 1*d* starts moving at the start of the operation of the robot 1. The finally input node is an end point at which the movement of the end effector 1*d* ends when the operation of the robot 1 ends. A node represents the position and the posture of the end effector 1*d* disposed at the node in a three dimensional coordinate system. Three dimensional coordinate system referred to herein is a base coordinate system with reference to a base 1*c* portion of the robot 1. The origin of the base coordinate system is determined, for example, on a base 1*c* portion of the robot 1. The position of the end effector 1*d* is expressed by xyz coordinates in the base coordinate system. The posture of the end effector 1*d* is expressed by a roll angle, a pitch angle, and a yaw angle. The x axis, the y axis, and the z axis in the base coordinate system are orthogonal to each other. The x coordinate represents a position in the x-axis direction. The y coordinate represents a position in the y-axis direction. The z-coordinate represents a position in the z-axis direction. The roll angle represents a rotation angle around the x-axis. The pitch angle represents a rotation angle around the y axis. The yaw axis represents a rotation angle around the z axis.

2. CONFIGURATION OF TEACHING SUPPORT APPARATUS

Figures 2, 3:
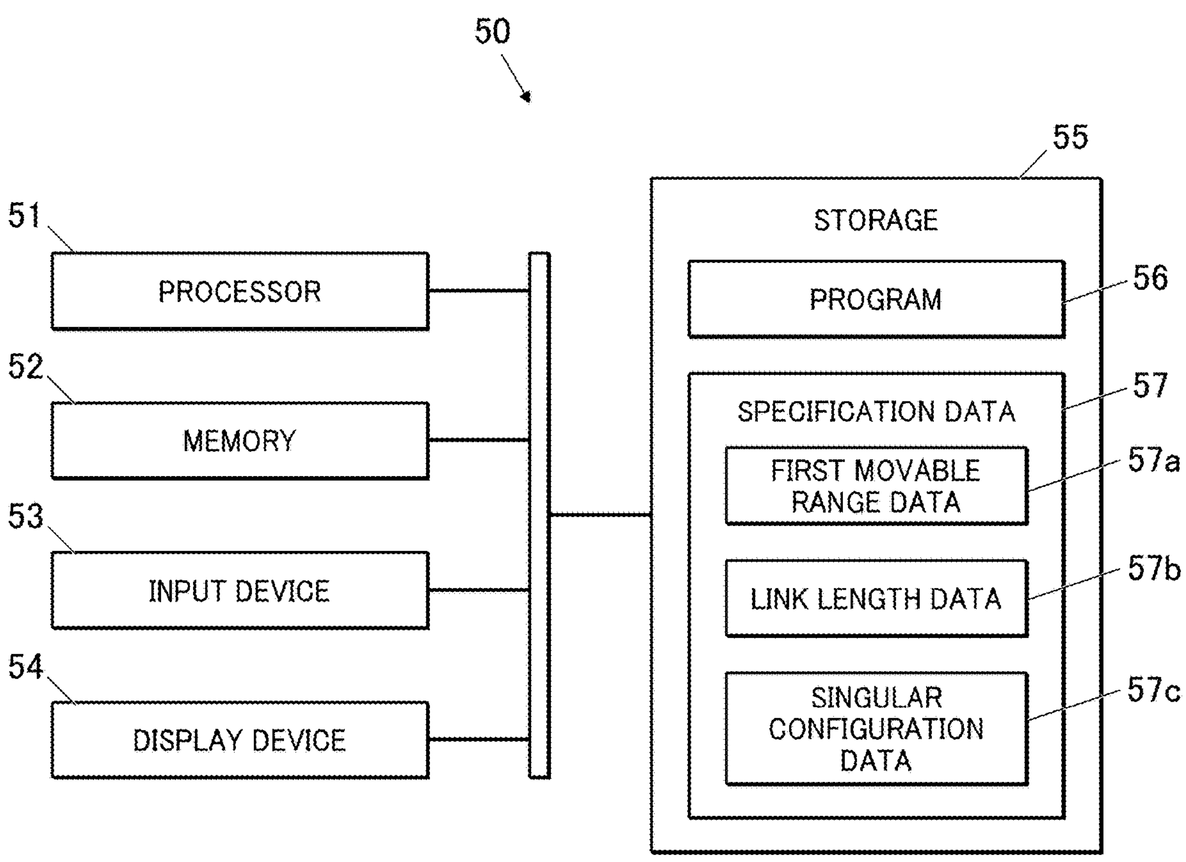
FIG. 2 is a block diagram of the teaching support apparatus.
FIG. 3 is a diagram illustrating an example of a data configuration of a first node.

FIG. 2 is a block diagram of the teaching support apparatus 50.

The teaching support apparatus 50 is, for example, a computer system such as a laptop computer system, a tablet computer system, a desktop computer system, a cloud computer system, a host computer system, or a smartphone.

The teaching support apparatus 50 includes a processor 51 (i.e., a hardware processor), a memory 52, an input device 53, a display device 54, and a storage 55. The teaching support apparatus 50 may include constituent elements other than the constituent elements illustrated in FIG. 2.

The processor 51 is a computer including one or more central processing units (CPUs). The processor 51 may include a graphics processing unit (GPU) in addition to the CPU. The GPU performs an operation under a command of the CPU. The processor 51 performs various kinds of arithmetic processing. The processor 51 governs the overall control of the teaching support apparatus 50.

The memory 52 is formed with a RAM such as a volatile memory. The memory 52 provides the processor 51 with a storage area and a working area for temporary storage of data during arithmetic processing by the processor 51.

The input device 53 is configured by a device such as a touch panel, a mouse, a touch pad, a stylus, a pointing device, a keyboard, a key, or a push button. When the worker 99 performs a gesture, such as pressing, moving, sliding, dragging, dropping, clicking, multi-clicking, touching, multi-touching, tapping, multi-tapping, or swiping, on the input device 53, the processor 51 recognizes and acquires input information or a command corresponding to the gesture. A gesture is also referred to as an operation.

The display device 54 is configured by a display device such as a liquid-crystal display device or an organic electroluminescence (organic EL) display device. The processor 51 generates a screen for realizing a graphical user interface (GUI). When the video signal of the screen is output to the display device 54, the display device 54 displays the screen in accordance with the video signal.

The storage 55 is configured by a storage device such as a semiconductor storage device or a magnetic storage device. The storage 55 may be a network attached storage (NAS), a data server, a file server, or a cloud computing system that is connected to the teaching support apparatus 50 via a computer network. Operating System (OS) Is installed in the teaching support apparatus 50. Various programs constituting the OS are stored in the storage. The processor 51 can execute various programs constituting the OS. The OS may be a general-purpose OS such as Windows®, Android®, iOS®, macOS®, Linux®, or Unix®. A program 56 is stored in the storage 55, and the program 56 is installed in the OS. The processor 51 enables the program 56 to be executed on the OS. The specification data 57 usable in the program 56 is stored in the storage 55.

The specification data 57 includes first movable range data **57*a*, link length data 57*b*, and singular configuration data 57*c*. The first movable range data 57*a* represents a movable range of each of the joints 1*a* of the robot 1 in terms of a maximum limit angle and a minimum limit angle. The link length data 57*b* represent the lengths of the respective links 1*b* of the robot 1. The singular configuration data 57*c* represents an uncontrollable singular configuration that the robot 1 cannot adopt, by the angles of the joints 1*a* of the robot 1** having adopted the singular configuration. The singular configuration is also referred to as a singular point.

3. OPERATION OF TEACHING SUPPORT APPARATUS

A teaching work that a worker performs using the teaching support apparatus 50 will be described below. In addition, a flow of a series of processes executed by the processor 51 according to the program 56 will be described below.

(1) Activation

When the worker 99 operates the input device 53 to instruct activation of the program 56, the processor 51 activates the program 56 in accordance with the instruction. Then, the processor 51 executes the following series of processes according to the program 56.

(2) Acquisition of Position Information and Posture Information of First Node

The worker 99 operates the input device 53 to designate the first node, and then the worker 99 inputs the position information and the posture information on the first node. Then, the processor 51 numbers the position information and the posture information as the first node and stores them in the memory 52. Such a number is hereinafter referred to as a node number. A node includes position information and posture information in the base coordinate system. The position information represents the position of the end effector **1*d* in the base coordinate system. The position information includes an x coordinate, a y coordinate, and a z coordinate. The posture information represents the posture of the end effector 1*d* in the base coordinate system. The posture information includes a roll angle, a pitch angle, and a yaw angle. A node is a six dimensional vector, and elements of the six dimensional vector are an x coordinate, a y coordinate, a z coordinate, a roll angle, a pitch angle, and a yaw angle. FIG. 3 is a data configuration diagram illustrating an example of a data configuration of a first node 61 stored in a memory 52. (x_1, y_1, z_1) is position information of the first node 61; and (roll_1, pitch_1, yaw_1) is posture information of the first node 61**.

(3) Calculation of First Plurality of Joint Angle Sets

Next, the processor 51 calculates a plurality of joint angle sets from the position information and the posture information of the first node by inverse kinematics analysis, using the specification data 57, in particular, the first movable range data **57*a* and the link length data 57*b*. Each of joint angle sets represents the posture of the robot 1 by the angle of each joint 1*a* of the robot 1. That is, since the joint angle set is a combination of the angles of the six joints 1*a* of the robot 1, the joint angle set is a six dimensional vector having the angles of the six joints 1*a* of the robot 1 as elements. A combination of the calculated angles of the six joints 1*a*, that is, a joint angle sets represents a posture of the robot 1 such that the end effector 1*d*** takes a position and a posture like the position information and the posture information of the nodes. Note that the joint angle set is also referred to as a seed.

Figure 4:
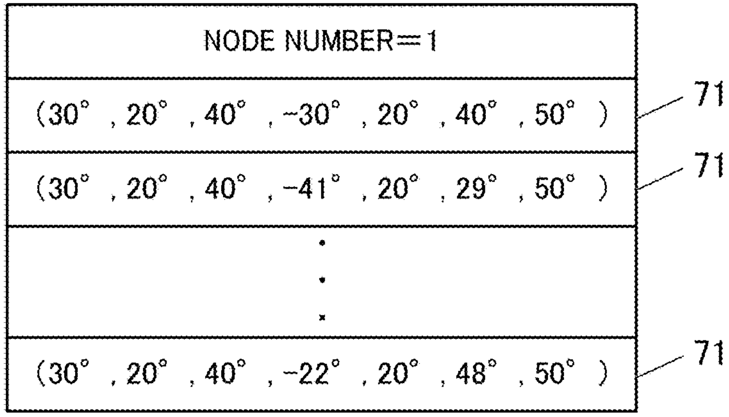
FIG. 4 is a diagram illustrating an example of a data configuration of a plurality of joint angle sets of a node number "1"

Next, the processor 51 stores the calculated plurality of joint angle sets in the memory 52 in association with the node numbers. FIG. 4 is a data configuration diagram showing an example of the data configuration of the plurality of joint angle sets 71 stored in the memory 52.

(4) Plurality of Nodes

Figure 5:
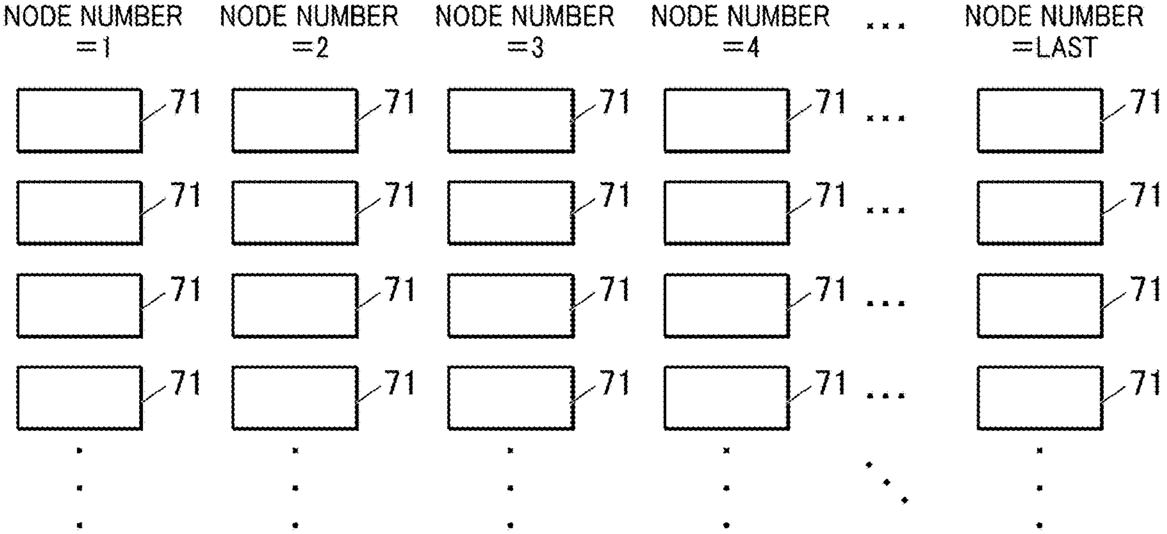
FIG. 5 is a diagram illustrating joint angle sets from the first node to a last node.

When the worker 99 performs the same operation as in the above (2) one after another in the ascending order of the node numbers, the processor 51 performs the same processing as in the above (2) and the above (3) for each same operation. Therefore, as illustrated in FIG. 5, the processor 51 numbers the plurality of nodes in ascending order, and stores, for each node number, the node number in the memory 52 in association with the plurality of joint angle sets 71.

(5) Combination Processing (Combining)

After the calculation of the plurality of joint angle sets 71 for each node number, the processor 51 creates a plurality of posture sets. The posture set is a combination of joint angle set(s) selected from the plurality of joint angle sets 71 for each node number, in the order of the node numbers. Details of the creation of the posture set are as described in (5-1) and (5-2) below.

(5-1) Selection of Initial Posture

The worker 99 operates the input device 53 to designate the node number "1", and then one of the plurality of joint angle sets 71 associated with the node number "1" is selected. Then, the processor 51 recognizes the selected one joint angle set 71. The selected joint angle set 71 represents the posture of the robot 1 such that the end effector 1*d* takes the position and posture such as the position information and the posture information of the first node 61.

Note that regardless of the presence or absence of the selection by the worker 99, the processor 51 may select one default from the plurality of joint angle sets 71 associated with the node number "1". The default joint angle set 71 represents a posture close to the standard posture of the robot 1.

Here, in a case where A is an arbitrary integer equal to or greater than 1, hereinafter, the joint angle set 71 associated with the node number "A" is referred to as "the joint angle set 71 of the node number "A"".

(5-2) Selection of Postures of Second and Subsequent Nodes

Next, the processor 51 selects one or two from the plurality of joint angle sets 71 corresponding to the node number "2". The selection of one or two from the plurality of joint angle sets 71 corresponding to the node number "2" is specifically as follows.

The processor 51 subtracts the selected joint angle set 71 of the node number "1" from each of the joint angle sets 71 of the node number "2" to obtain the magnitude of the difference. The processor 51 compares the magnitudes of these differences. The processor 51 recognizes the smallest difference based on the comparison of the magnitudes of the differences, and recognizes the second smallest difference as necessary. The processor 51 selects, from among the plurality of joint angle sets 71 corresponding to the node number "2", the joint angle set 71 that takes the smallest difference. The processor 51 selects the joint angle set 71 that takes the second smallest difference as necessary.

Figure 6:
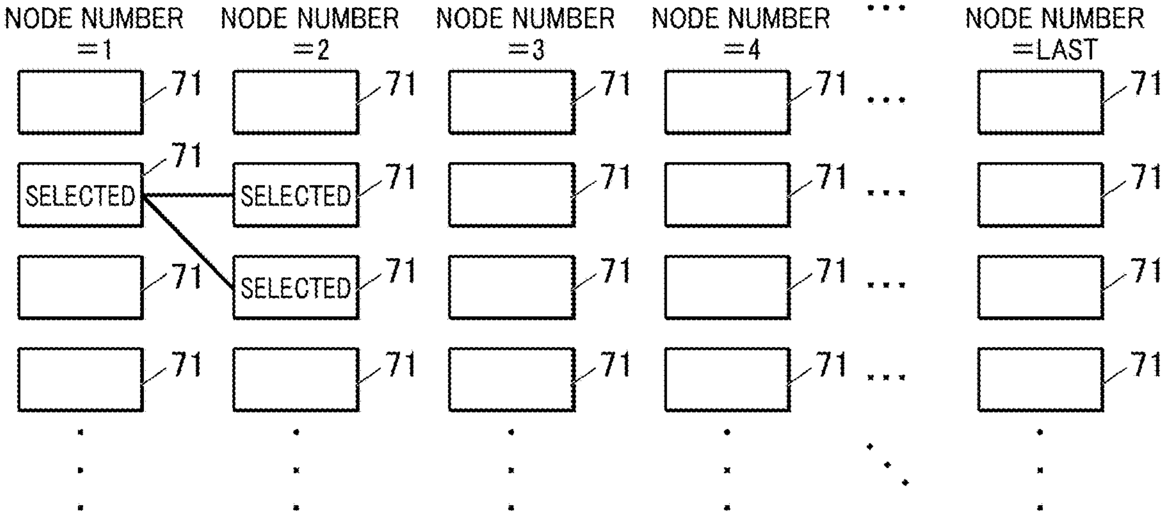
FIG. 6 is a diagram showing the association between the selected joint angle set of the node number "1" and the selected joint angle sets of the node number "2"

After the selection of the joint angle sets 71 having the node number "2", as illustrated in FIG. 6, the processor 51 associates the selected joint angle sets 71 having the node number "2" with the selected joint angle set 71 having the node number "1". In FIG. 6, a line connecting the joint angle set 71 having the node number "1" and each joint angle set 71 having the node number "2" represents association between the joint angle set 71 having the node number "1" and the joint angle set 71 having the node number "2".

Thereafter, the processor 51 executes the same processing for the node number "3" and later. That is, assuming that N is an arbitrary integer from 2 to the total number of nodes, the processor 51 selects one or two from among the plurality of joint angle sets 71 of the node number "N", and then associates the selected joint angle set(s) 71 of the node number "N" with the selected joint angle set(s) 71 of the node number "N−1".

Figure 7:
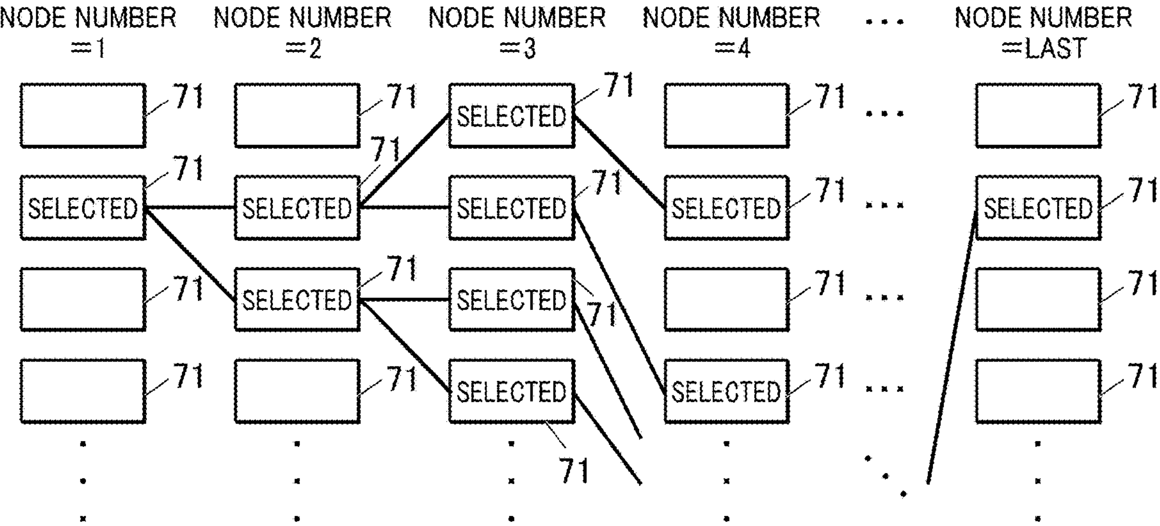
FIG. 7 is a diagram illustrating combinations of associated joint angle sets from the first node number to the last node number.

By the processor 51 executing the processing as described above, each combination of the associated joint angle sets 71 from the first node number to the last node number is created as shown in FIG. 7. In FIG. 7, a line connecting two joint angle sets 71 represents association between the joint angle sets 71.

Here, during the creation of the combinations of the joint angle sets 71 associated with the node numbers from the first node number to the last node number, the processor 51 performs twice the selection of two of the plurality of joint angle sets 71 corresponding to the node number "N". Therefore, the number of combinations of the joint angle sets 71 associated from the first node number to the last node number is four. Note that the processor 51 may perform the selection of two of the plurality of joint angle sets 71 having the node number "N" three or more times, or may perform the selection once. When the number of times of such selection is expressed as m, the number of combinations is expressed as $2^m$. Furthermore, m is any integer from 1 to a value obtained by subtracting 1 from a total number of nodes.

Hereinafter, a combination of the joint angle sets 71 associated from the first node number to the last node number is referred to as a posture set.

Note that after creating the combinations of the joint angle sets 71 associated with the node numbers from the first node number to the last node number, the processor 51 may subtract the joint angle set 71 of the selected last node number from each of the joint angle sets 71 of the node number "1" to obtain the magnitude of the difference. In this case, the processor 51 compares the magnitudes of these differences. The processor 51 recognizes the smallest difference based on the comparison of the magnitudes of the differences. The processor 51 selects, from among the plurality of joint angle sets 71 corresponding to the node number "1", the joint angle set 71 that takes the smallest difference. Assuming that the thus selected joint angle set 71 having the node number "1" has been selected in the processing of (5-1) described above, the processor 51 executes the processing of (5-2) again. Therefore, $2^m$ combinations of the joint angle sets 71 associated from the first node number to the last node number are newly created. The previously created $2^m$ sets of combinations may be discarded, and the newly created combinations of the $2^m$ sets may be used in subsequent processing. Both the previously created combinations of the $2^m$ sets and the newly created combinations of the $2^m$ sets may be used in the subsequent processing.

(6) Path Set Creation (6-1)

The processor 51 uses a path creation algorithm to create time-series data for each joint 1*a* based on the posture set. The time-series data is a discrete path from an angle included in the joint angle set 71 of the first node number to an angle included in the joint angle set 71 of the last node number.

Figure 8:
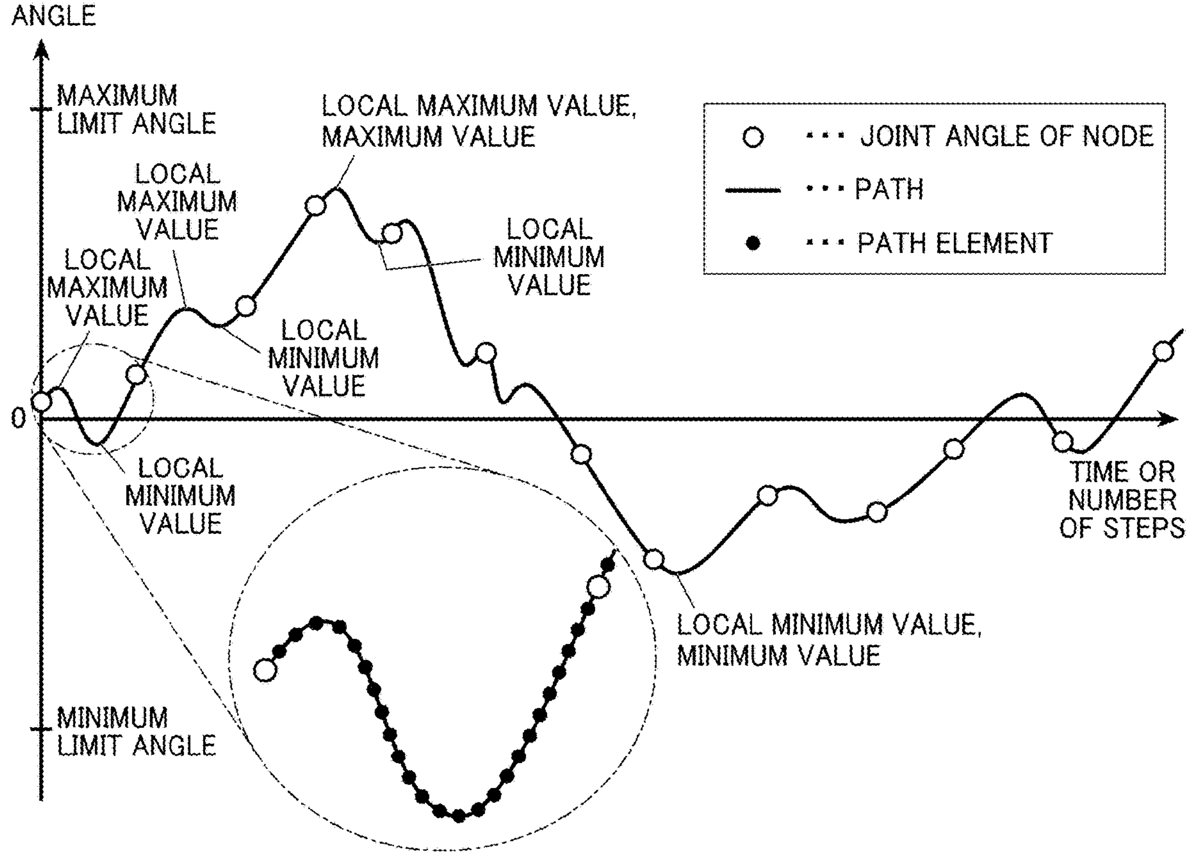
FIG. 8 is a chart illustrating an example of a path of a joint.

FIG. 8 is a chart illustrating an example of a path of any one of the joints 1*a*. In the chart, the vertical axis represents the angle of the joint 1*a*. In the chart, the horizontal axis represents the number of steps or time in a time series. A path is discrete time-series data. A set of elements constituting the time-series data is a path. The elements are also referred to as waypoints. Since the number of joints 1*a* of the robot 1 is six, six paths, that is, six time-series data, are created for each posture set. A combination of six paths for each posture set is referred to as a path set. Since the Number of Posture Sets is $2^m$, the Number of Path Sets is $2^m$.

(6-2) Creation Failure of a Path Set and Reselection of an Initial Posture

The processor 51 may fail to create a path set for each posture set. For example, if the processor 51 has not completed the creation of a path set for each posture set even after a predetermined time has elapsed from the start of the processing of the path creation algorithm, it means that the creation of a path set has failed. In such a case, the processor 51 reselects another one of the plurality of joint angle sets 71 associated with the node number "1". The reselection of another one of the plurality of joint angle sets 71 associated with the node number "1" is as follows.

The processor 51 subtracts one or two joint angle sets 71 of the node number "2" selected in the above (5-2) from each joint angle set 71 of the node number "1", and calculates the magnitude of the difference. The processor 51 compares the magnitudes of these differences. The processor 51 recognizes the smallest difference based on the comparison of the magnitudes of the differences. The processor 51 reselects, from among the plurality of joint angle sets 71 corresponding to the node number "1," the joint angle set 71 that takes the smallest difference. After the reselection, the processor 51 executes the processes of (5-2) and (6-1) again.

(6-3) Re-Failure of Creation of Path Set and Re-Reselection of Initial Posture

Even when the processor 51 executes the processes (5-2) and (6-1) again, the processor 51 may fail to create a path set for each posture set again. For example, if the processor 51 has not completed the creation of a path set for each posture set even after a predetermined time has elapsed from the start of the processing of the path creation algorithm, it means that the creation of a path set has failed again. In such a case, the processor 51 reselects another one of the plurality of joint angle sets 71 associated with the node number "1". The reselection of another one of the plurality of joint angle sets 71 associated with the node number "1" is as follows.

The processor 51 subtracts the initially selected joint angle set 71 of the node number "1" from each joint angle set 71 of the node number "2", and calculates the magnitude of the difference. The processor 51 compares the magnitudes of these differences. The processor 51 recognizes the largest difference based on the comparison of the magnitudes of the differences. The processor 51 designates the joint angle set 71 having the largest difference from among the plurality of joint angle sets 71 corresponding to the node number "2". The processor 51 subtracts the designated joint angle set 71 of the node number "2" from each joint angle set 71 of the node number "1", and calculates the magnitude of the difference. The processor 51 compares the magnitudes of these differences. The processor 51 recognizes the smallest difference based on the comparison of the magnitudes of the differences. The processor 51 re-reselects, from among the plurality of joint angle sets 71 corresponding to the node number "1", the joint angle set 71 that takes the smallest difference. After the re-reselection, the processor 51 executes the processes of (5-2) and (6-1) again.

(7) Path Set Evaluation

After successful creation of a path set for each posture set, the processor 51 evaluates each path set and selects one from among the plurality of path sets based on the evaluation of each path set. The evaluation processing (evaluating) by the processor 51 includes department evaluation processing and comprehensive evaluation processing (comprehensive evaluating). The department evaluation processing and the comprehensive evaluation processing will be described in detail below.

(7-1) Department Evaluation Processing

After successful creation of a path set for each posture set, the processor 51 assigns an evaluation rank to each path set by evaluating each path set according to the following first to fifth evaluation criteria. Note that all of the following first to fifth evaluation criteria may be adopted, or any one, two, three, or four of the first to fifth evaluation criteria may be adopted. The worker 99 may input whether to adopt each of the following first to fifth evaluation criteria by operating the input device 53, and the processor 51 may determine, according to the input, whether to adopt each of the first to fifth evaluation criteria.

(7-1A) First Evaluation Criterion

The processor 51 counts, for each time-series data included in a path set (i.e., for each joint 1*a*), the total number of elements constituting the time-series data, i.e., the total number of waypoints. If necessary, the processor 51 may weight the total number by a weight specific to each joint 1*a*. The weight may be input by the worker 99 operating the input device 53.

The processor 51 integrates the calculated total numbers for each path set to calculate the integrated value of the total numbers. Hereinafter, the integrated value of the total numbers for each path set is also referred to as a first evaluation reference value.

The processor 51 compares the integrated values of the total numbers of these path sets, that is, the first evaluation reference values. Based on the comparison of the integrated values of the total numbers, the processor 51 assigns evaluation ranks to the path sets in ascending order of the integrated values of the total numbers. Therefore, the evaluation rank of the path set having the smallest integrated value of the total number is the highest, and the evaluation rank of the path set having the largest integrated value of the total number is the lowest.

Note that the path creation algorithm has a characteristic that the greater the difference between the joint angle set 71 of a certain node number and the joint angle set 71 of the next node number, the greater the pitch of the path between those nodes. Therefore, as the integrated value of the total number is larger, each path of the path set becomes more complicated. The smaller the integrated value of the total number is, the simpler each path of the path set is. Therefore, the lower the evaluation rank of the path set is, the more complicated each path of the path set is. The higher the evaluation rank of the path set is, the simpler each path of the path set is.

(7-1B) Second Evaluation Criterion

The processor 51 extracts, for each piece of time-series data included in a path set, a local minimum value and a local maximum value in time series from among elements constituting the time-series data. That is, the processor 51 extracts the local minimum value and the local maximum value in time series from the elements constituting the time-series data for each joint 1*a*. The processor 51 calculates, for each of the extracted local minimum values and local maximum values, the absolute value of the difference between the local minimum value or local maximum value and the immediately preceding local minimum value or local maximum value. If desired, the processor 51 may weight the absolute values of the differences by weights specific to each joint 1*a*. The weight may be input by the worker 99 operating the input device 53.

Next, the processor 51 integrates the absolute values of the obtained differences for each path set to calculate an integrated value of the absolute values. Hereinafter, the integrated value for each path set is also referred to as a second evaluation reference value.

Next, the processor 51 compares the integrated values of these path sets, that is, the second evaluation reference values. The processor 51 assigns the evaluation rank to the path sets in ascending order of the integrated value based on the comparison of the integrated values of the path sets. Therefore, the evaluation rank of the path set having the smallest integrated value is the highest, and the evaluation rank of the path set having the largest integrated value is the lowest.

Note that the greater the magnitude of the difference between a local minimum value or a local maximum value and the next local maximum value or the next local minimum value in the path of the joint 1*a*, the greater the angle of the joint 1*a*. Therefore, as the integrated value of a path set is larger, each path of the path set becomes more complicated. The smaller the integrated value of a path set, the simpler each path in the path set becomes. Therefore, the lower the evaluation rank of the path set is, the more complicated each path of the path set is. The higher the evaluation rank of the path set is, the simpler each path of the path set is.

(7-1C) Third Evaluation Criterion

The processor 51 extracts the maximum value and the minimum value from the elements constituting the time-series data for each time-series data included in the path set. That is, the processor 51 extracts, for each joint 1*a*, the maximum value and minimum values from among the elements constituting the time-series data. Next, the processor 51 calculates the absolute of the difference between the maximum limit angle and the maximum value of the first movable range data 57*a*. Furthermore, the processor 51 calculates the absolute of the difference between the minimum limit angle and the minimum value in the first movable range data 57*a*. If desired, the processor 51 may weight the absolute values of the differences by weights specific to each joint 1*a*. The weight may be input by the worker 99 operating the input device 53.

Next, the processor 51 integrates the absolute values of the differences for each path set to calculate the integrated value of the absolute values. Hereinafter, the integrated value for each path set is also referred to as a third evaluation reference value.

Next, the processor 51 compares the integrated values of these path sets, that is, the third evaluation reference values. Based on the comparison of the integrated values of the path sets, the processor 51 assigns evaluation ranks to the path sets in descending order of the integrated values. Therefore, the evaluation rank of the path set having the largest integrated value is the highest, and the evaluation rank of the path set having the smallest integrated value is the lowest.

Note that the smaller the absolute of the difference between the maximum value of the path of a joint 1*a* and the maximum limit angle is, the smaller the margin of rotation of the joint 1*a* is. The greater the absolute of the difference between the maximum value of the path of a joint 1*a* and the maximum limit angle, the greater the margin of rotation of the joint 1*a*. The smaller the absolute of the difference between the minimum value of the paths of a joint 1*a* and the minimum limit angle is, the less the margin of rotation of the joint 1*a* is. The greater the absolute of the difference between the minimum value of the path of a joint 1*a* and the minimum limit angle, the greater the margin of rotation of the joint 1*a*. Therefore, as the evaluation rank of the path set is lower, the joint 1*a* portion has a smaller margin for rotation. The higher the evaluation rank of a path set, the greater the rotation allowance of the joint 1*a* portion.

(7-1D) Fourth Evaluation Criterion

The processor 51 calculates, for each path set, the minimum operability based on the plurality of time-series data and the singular configuration data 57*c* included in the path set. The operability is an indicator representing the difference between the angle of each of the joints 1*a* and the singular configuration data 57*c* when the robot 1 takes a certain configuration, and the smaller the operability is, the closer the configuration of the robot 1 is to the singular configuration specified by the singular configuration data 57*c*. Hereinafter, the minimum operability for each path set is also referred to as a fourth evaluation reference value.

Next, the processor 51 compares the minimum operability, that is, the fourth evaluation reference values of these path sets. The processor 51 assigns an evaluation rank to the path sets in descending order of the minimum operability based on the comparison of the minimum operability of the path sets. Therefore, the evaluation rank of the path set having the largest minimum operability is the highest, and the evaluation rank of the path set having the smallest minimum operability is the lowest.

Note that as the evaluation rank of a path set is lower, each of the joints 1*a* of the robot 1 has a smaller margin from the singular configuration. As the evaluation rank of the path set is higher, each of the joints 1*a* of the robot 1 has a larger margin from the singular configuration.

(7-1E) Fifth Evaluation Criterion

The processor 51 calculates the difference between each element constituting the time-series data and the immediately preceding element to obtain the largest difference for each time-series data included in the path set. That is, the processor 51 calculates the largest difference for each joint 1*a*. If desired, the processor 51 may weight the largest difference by a weight specific to each joint 1*a*. The weight may be input by the worker 99 operating the input device 53.

Next, the processor 51 integrates the largest differences for each path set to calculate the integrated value of the largest differences. Hereinafter, the integrated value for each path set is also referred to as a fifth evaluation reference value.

Next, the processor 51 compares the integrated values of these path sets, that is, the fifth evaluation reference values. The processor 51 assigns the evaluation rank to the path sets in ascending order of the integrated value based on the comparison of the integrated values of the path sets. Therefore, the evaluation rank of the path set having the smallest integrated value is the highest, and the evaluation rank of the path set having the largest integrated value is the lowest.

Note that the difference between each of the elements constituting the time-series data and the immediately preceding one represents the rate of change of the angle of the joint 1*a* per unit time. The greater the rate of change in the angle of the joint 1*a* per unit time, the faster the rotation speed of the joint 1*a* needs to be. An increase in the rotation speed of the joint 1*a* may be disadvantageous in terms of sound, vibration, and power. Therefore, according to the fifth evaluation criterion, the path sets are evaluated based on the integrated value of the largest differences for each path set.

(7-2) Comprehensive Evaluation Processing

After the department evaluation processing, the processor 51 assigns an overall score to each path set based on the evaluation rank according to the first to fifth evaluation criteria.

For example, as illustrated in FIG. 9, the processor 51 may give each path set a score in ascending order according to the ascending order of the evaluation ranks of the first to fifth evaluation criteria, and then add up these scores for each path set, thereby giving each path set an overall score. For example, the processor 51 may assign, to each path set, a score in descending order according to ascending order of the evaluation ranks of the first to fifth evaluation criteria, and then add up these scores for each path set to assign an overall score to each path set.

For example, as illustrated in FIG. 10, the processor 51 may assign the lowest score "0" to the "first" in the evaluation rank according to the first to fifth evaluation criteria, assign the highest score "1" to the "second to fourth" in the evaluation rank according to the first to fifth evaluation criteria, and add up these scores for each path set to assign an overall score to the path set. For example, the processor 51 may assign the highest score "1" to the "first" in the evaluation rank according to the first to fifth evaluation criteria, assign the lowest score "0" to the "second to fourth" in the evaluation rank according to the first to fifth evaluation criteria, and add up these scores for each path set to assign a overall score to the path set.

The processor 51 may assign a weight to a score assigned to the evaluation rank according to any one of the first to fifth evaluation criteria. The weight may be input by the worker 99 operating the input device 53.

For example, as illustrated in FIG. 9, the processor 51 assigns, to each path set, an ascending weightless score according to the ascending order of the evaluation ranks according to the first, third, and fourth evaluation criteria. Further, as shown in FIG. 11, the processor 51 assigns a weighting score in ascending order according to the ascending order of the evaluation rank according to the second evaluation criterion to each path set. The weighted score in FIG. 11 is obtained by multiplying the weightless score in FIG. 9 by the weight "2". Furthermore, as shown in FIG. 12, the processor 51 assigns a weighting score in ascending order according to the ascending order of the evaluation rank according to the fifth evaluation criterion to each path set. The weighted score in FIG. 12 is obtained by multiplying the weightless score in FIG. 9 by the weight "1.5". Then, the processor 51 adds up these scores for each path set to assign an overall score to the path set.

Note that the processor 51 may assign a weight of "0" to the score assigned to the evaluation rank according to the criterion that has not been adopted among the first to fifth evaluation criteria. Then, the un-adopted criterion is ignored.

After the total scoring for each path set, the processor 51 assigns an overall rank to each path set based on the overall score assigned to each path set.

For example, as illustrated in FIG. 9, in a case where the processor 51 assigns scores in ascending order according to the ascending order of the evaluation ranks of the first to fifth evaluation criteria to the respective path sets, the processor 51 assigns total ranks in ascending order according to the ascending order of the overall scores to the respective path sets. For example, if the processor 51 assigns each path set a score in descending order according to the ascending order of the evaluation ranks of the first to fifth evaluation criteria, the processor 51 assigns each path set an overall rank in ascending order according to the descending order of the overall scores. It should be noted that the evaluation of the path set to which the overall rank "first" is given is the best.

Next, the processor 51 compares the overall ranks of the path sets. The processor 51 selects the path set with the overall rank "first" based on the comparison of the overall ranks of the path sets.

(8) Creation of Operation Program

The processor 51 creates the operation program including the path set to which the overall rank "first" is assigned. The processor 51 records the operation program in the storage 55.

4. CONCLUSION

The path set includes the number of paths corresponding to the number of joints 1*a* of the robot 1. A path is discrete time-series data that represents a transition of an angle of a joint 1*a* of the robot 1. The processor 51 evaluates each such path set. The processor 51 selects, based on the evaluation of each path set, a path set having the best evaluation from among the plurality of path sets. Therefore, when the robot 1 is controlled in accordance with the operation program including the best evaluated path set, the joints 1*a* of the robot 1 do not move unnecessarily.

The evaluation processing by the processor 51 includes department evaluation processing and comprehensive evaluation processing. In the department evaluation processing, the processor 51 assigns an evaluation rank to each path set by evaluating each path set according to the first to fifth evaluation criteria. In the comprehensive evaluation processing, the processor 51 assigns an overall score to each path set based on the evaluation ranks according to the first to fifth evaluation criteria, and assigns an overall rank to each path set based on the overall score assigned to each path set. Such an evaluation method realizes multifaceted evaluation of each path set from various viewpoints. Therefore, the operation program including the best evaluated path set has a high probability of eliminating unnecessary motion of the joints 1*a* of the robot 1.

A path set to be evaluated is created for each posture set. These posture sets are candidates narrowed down by the above-described combination processing (combining). Therefore, the load of the path set creation process and the evaluation process is low, and the time and resources required for the processor 51 to execute these processes are suppressed.

When creating the posture set, the processor 51 subtracts the selected joint angle set 71 of the N−1th node from each of the plurality of joint angle sets 71 of the Nth node. By comparing the magnitudes of these differences, the processor 51 selects, from among the plurality of joint angle sets of the Nth node, the joint angle set that takes the smallest difference. The processor 51 associates the joint angle set of the Nth node that is selected with the joint angle set of the N−1th node that is selected. Thus, the processor 51 creates a posture set. These processes contribute to creation of a path set that tends to be evaluated well.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-123623 filed on Jul. 28, 2023 is incorporated herein by reference in its entirety.

What is claimed is:

1. A method comprising:

sequentially acquiring a plurality of nodes each including position information and posture information of an end effector of an articulated robot having a plurality of joints and the end effector;

calculating, for each of the plurality of nodes acquired in the acquiring, a plurality of joint angle sets representing angles of the plurality of joints from the position information and the posture information included in each of the plurality of nodes;

creating a plurality of posture sets, each of the plurality of posture sets including two or more joint angle sets combined and associated with each other in an order of the plurality of nodes, each of the two or more joint angle sets being a joint angle set selected from among the plurality of joint angle sets calculated for each of the plurality of nodes;

creating, based on each of the plurality of posture sets, each of a plurality of path sets including a discrete path of each of the plurality of joints for each of the plurality of posture sets by creating, for each of the plurality of joints, the path from an angle of each joint of a joint angle set selected for a first node of the plurality of nodes to an angle of each joint of a joint angle set selected for a last node of the plurality of nodes;

selecting one path set from among the plurality of path sets based on an evaluation of each of the plurality of path sets;

creating an operation program including the one path set; and controlling the articulated robot according to the operation program.

2. The method according to claim 1, wherein the evaluation of each of the plurality of path sets includes comprehensively evaluating a plurality of evaluations according to a plurality of evaluation criteria.

3. The method according to claim 1, wherein the evaluation of each of the plurality of path sets includes evaluating each of the plurality of path sets based on an integrated value obtained by integrating total numbers of elements of paths included in each of the plurality of path sets.

4. The method according to claim 1, wherein the evaluation of each of the plurality of path sets includes evaluating each of the plurality of path sets based on an integrated value obtained by integrating absolute values of differences between local minimum values and local maximum values extracted from elements of paths included in each of the plurality of path sets.

5. The method according to claim 1, wherein the evaluation of each of the plurality of path sets includes evaluating each of the plurality of path sets based on an integrated value obtained by integrating absolute values of differences between maximum values extracted from elements of paths included in each of the plurality of path sets and maximum limit angles of the joints and absolute values of differences between minimum values extracted from elements of paths included in each of the plurality of path sets and minimum limit angles of the joints.

6. The method according to claim 1, wherein the evaluation of each of the plurality of path sets includes evaluating each of the plurality of path sets based on a minimum operability obtained from each of the plurality of path sets and singular configuration data of the articulated robot.

7. The method according to claim 1, wherein the evaluation of each of the plurality of path sets includes evaluating each of the plurality of path sets based on a largest difference among differences between elements of paths included in each of the plurality of path sets and elements immediately preceding the respective elements.

8. The method according to claim 1, wherein the evaluation of each of the plurality of path sets includes:

obtaining a first evaluation by evaluating each of the plurality of path sets based on an integrated value obtained by integrating total numbers of elements of paths included in each of the plurality of path sets;

obtaining a second evaluation by evaluating each of the plurality of path sets based on an integrated value obtained by integrating absolute values of differences between local minimum values and local maximum values extracted from elements of paths included in each of the plurality of path sets to obtain a second evaluation;

obtaining a third evaluation by evaluating each of the plurality of path sets based on an integrated value obtained by integrating absolute values of differences between maximum values extracted from elements of paths included in each of the plurality of path sets and maximum limit angles of the joints and absolute values of differences between minimum values extracted from elements of paths included in each of the plurality of path sets and minimum limit angles of the joints;

obtaining a fourth evaluation by evaluating each of the plurality of path sets based on a minimum operability obtained from each of the plurality of path sets and singular configuration data of the articulated robot;

obtaining a fifth evaluation by evaluating each of the plurality of path sets based on a largest difference among differences between elements of paths included in each of the plurality of path sets and elements immediately preceding the respective elements; and obtaining a comprehensive evaluation by comprehensively evaluating the first evaluation, the second evaluation, the third evaluation, the fourth evaluation and the fifth evaluation, and selecting a path set with a best comprehensive evaluation from among the plurality of path sets.

9. The method according to claim 8, wherein the comprehensively evaluating includes comprehensively evaluating by assigning weights to the first evaluation, the second evaluation, the third evaluation, the fourth evaluation and the fifth evaluation.

10. The method according to claim 8, wherein the comprehensively evaluating includes determining whether to adopt each of the first evaluation, the second evaluation, the third evaluation, the fourth evaluation and the fifth evaluation according to an operation by a worker.

11. The method according to claim 1, wherein the creating the plurality of posture sets includes:

selecting, for the first node among the plurality of nodes, one joint angle set from among the plurality of joint angle sets of the first node; and when N is any integer from 2 to a total number of the plurality of nodes, subtracting, for a subsequent node of the first node among the plurality of nodes, a selected joint angle set of an N−1th node from each of the plurality of joint angle sets of an Nth node, comparing magnitudes of these differences, selecting a joint angle set having a smallest difference from among the plurality of joint angle sets of the Nth node, and associating the selected joint angle set of the Nth node with the selected joint angle set of the N−1th node.

12. The method according to claim 11, wherein, the creating the plurality of posture sets further includes selecting a joint angle set having a second smallest difference in addition to the joint angle set having the smallest difference from among the plurality of joint angle sets of the Nth node.

13. The method according to claim 12, wherein, when m is any integer from 1 to a value obtained by subtracting 1 from a total number of the plurality of nodes, the selecting the joint angle set having the second smallest difference in addition to the joint angle set that having the smallest difference from among the plurality of joint angle sets of the Nth node is performed m times.

14. The method according to claim 11, wherein, from among the plurality of joint angle sets of the first node, the one joint angle set is selected by designation of a worker, selected by designation of a default, selected based on the joint angle set selected for the last node, or reselected based on a joint angle set selected for a second node.

15. A system comprising:

an articulated robot having a plurality of joints and an end effector;

a robot control apparatus connected to the articulated robot, the robot control apparatus being configured to control the articulated robot according to an operation program; and a teaching support apparatus comprising a hardware processor, wherein the hardware processor performs sequentially acquiring a plurality of nodes each including position information and posture information of the end effector, calculating, for each of the plurality of nodes acquired in the acquiring, a plurality of joint angle sets representing angles of the plurality of joints from the position information and the posture information included in each of the plurality of nodes, creating a plurality of posture sets, each of the plurality of posture sets including two or more joint angle sets combined and associated with each other in an order of the plurality of nodes, each of the two or more joint angle sets being a joint angle set selected from among the plurality of joint angle sets calculated for each of the plurality of nodes, creating, based on each of the plurality of posture sets, each of a plurality of path sets including a discrete path of each of the plurality of joints for each of the plurality of posture sets by creating, for each of the plurality of joints, the path from an angle of each joint of a joint angle set selected for a first node of the plurality of nodes to an angle of each joint of a joint angle set selected for a last node of the plurality of nodes, and selecting one path set from among the plurality of path sets based on an evaluation of each of the plurality of path sets; and creating the operation program including the one path set.

16. The method according to claim 1, further comprising: sending the operation program to a robot control apparatus which controls the articulated robot according to the operation program.

17. The system according to claim 15, wherein the hardware processor further performs sending the operation program to the robot control apparatus.

* * * * *